US010712927B2

(12) United States Patent
Naegelkraemer et al.

(10) Patent No.: US 10,712,927 B2
(45) Date of Patent: Jul. 14, 2020

(54) SYSTEM AND METHOD FOR CALL MANAGEMENT IN SINGLE WINDOW COMMUNICATION ENDPOINTS

(71) Applicant: Avaya Inc., Santa Clara, CA (US)

(72) Inventors: Marcel Naegelkraemer, Kanata (CA); Justin Baltazor, Brentwood, CA (US); Christian Ellens, Nepean (CA); Tim Rahrer, Ottawa (CA)

(73) Assignee: Avaya Inc., Santa Clara, CA (US)

( * ) Notice: Subject to any disclaimer, the term of this patent is extended or adjusted under 35 U.S.C. 154(b) by 1268 days.

(21) Appl. No.: 14/872,813

(22) Filed: Oct. 1, 2015

(65) Prior Publication Data

US 2016/0364127 A1    Dec. 15, 2016

Related U.S. Application Data

(60) Provisional application No. 62/175,106, filed on Jun. 12, 2015.

(51) Int. Cl.
*G06F 3/0486* (2013.01)
*H04M 1/725* (2006.01)
*H04M 3/56* (2006.01)
*G06F 3/16* (2006.01)
*H04M 3/428* (2006.01)

(52) U.S. Cl.
CPC ...... *G06F 3/0486* (2013.01); *H04M 1/72522* (2013.01); *H04M 3/563* (2013.01); *G06F 3/165* (2013.01); *H04M 3/428* (2013.01); *H04M 2201/38* (2013.01)

(58) Field of Classification Search
None
See application file for complete search history.

(56) References Cited

U.S. PATENT DOCUMENTS

| 6,025,871 A * | 2/2000 | Kantor | H04N 7/15 348/14.03 |
| 6,191,807 B1 * | 2/2001 | Hamada | H04N 7/15 348/14.03 |
| 7,231,208 B2 | 6/2007 | Robertson | |

(Continued)

OTHER PUBLICATIONS

Mario Aguilar, What Are Facebook Chat Heads?, Apr. 4, 2013, 2 pages (Year: 2013).*

*Primary Examiner* — Yongjia Pan
(74) *Attorney, Agent, or Firm* — Sheridan Ross P.C.

(57) ABSTRACT

When a communication session is established, display information is sent to a first window of a communication application. The first window of the communication application displays current status information for the live communication session. For example, the first window may include a mute status (e.g., that the call is currently muted by the user) and call time. When the display of the communication application is switched to a second window that covers the first window, display information for a call dart is sent that displays current status information for the first live communication session over a portion of the second window. For example, the call dart may be a small thumbnail or banner that allows the user to view the current status of the live communication session, such as the mute status of the live communication session and the current duration of the live communication session.

20 Claims, 7 Drawing Sheets

(56) References Cited

U.S. PATENT DOCUMENTS

| | | | |
|---|---|---|---|
| 8,442,197 B1 | 5/2013 | Mazza et al. | |
| 9,007,421 B2 * | 4/2015 | Couse | H04L 12/1822 348/14.01 |
| 9,723,421 B2 * | 8/2017 | Hwang | H04R 29/004 |
| 2004/0103156 A1 * | 5/2004 | Quillen | H04L 67/36 709/206 |
| 2006/0075359 A1 * | 4/2006 | Bauchot | G06F 9/4443 715/790 |
| 2008/0037751 A1 * | 2/2008 | Aldrey | H04M 3/42161 379/202.01 |
| 2009/0030971 A1 * | 1/2009 | Trivedi | G06F 3/0486 709/203 |
| 2009/0183080 A1 * | 7/2009 | Thakkar | G06F 17/30056 715/733 |
| 2009/0311933 A1 | 12/2009 | Mihoichi et al. | |
| 2010/0220172 A1 * | 9/2010 | Michaelis | H04N 7/147 348/14.08 |
| 2010/0246571 A1 | 9/2010 | Geppert et al. | |
| 2010/0251119 A1 | 9/2010 | Geppert et al. | |
| 2010/0251127 A1 | 9/2010 | Geppert et al. | |
| 2010/0251142 A1 | 9/2010 | Geppert et al. | |
| 2010/0251158 A1 | 9/2010 | Geppert et al. | |
| 2010/0251177 A1 | 9/2010 | Geppert et al. | |
| 2014/0063175 A1 * | 3/2014 | Jafry | H04M 1/67 348/14.02 |
| 2014/0111597 A1 * | 4/2014 | Anderson | H04L 12/1827 348/14.03 |
| 2014/0184723 A1 * | 7/2014 | Morrison | H04N 7/147 348/14.07 |
| 2014/0189005 A1 | 7/2014 | Ding-Trong et al. | |
| 2015/0135098 A1 | 5/2015 | Geppert et al. | |
| 2015/0326621 A1 | 11/2015 | Roessler et al. | |
| 2016/0036962 A1 * | 2/2016 | Rand | H04R 1/1041 455/418 |
| 2016/0255126 A1 * | 9/2016 | Sarris | H04L 65/1096 348/14.08 |
| 2017/0155609 A1 * | 6/2017 | Zheng | H04L 51/18 |

* cited by examiner

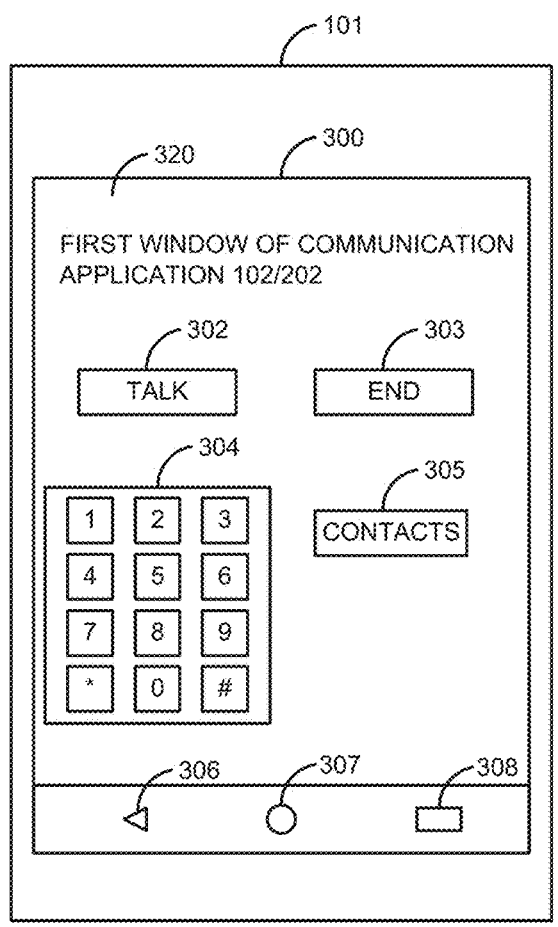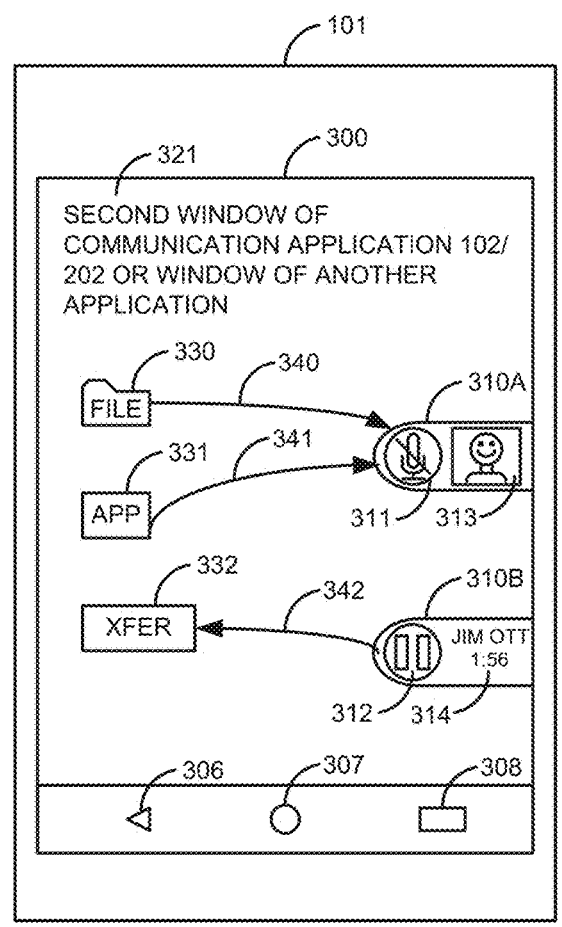
FIG. 3A
FIG. 3B

SYSTEM AND METHOD FOR CALL MANAGEMENT IN SINGLE WINDOW COMMUNICATION ENDPOINTS

CROSS REFERENCE TO RELATED APPLICATIONS

This application claims the benefit under 35 U.S.C. § 119(e) of U.S. Provisional Application No. 62/175,106, filed Jun. 12, 2015, entitled "CALL DART SYSTEM AND METHOD," the entire disclosure of which is incorporated herein by reference.

TECHNICAL FIELD

The systems and methods disclosed herein relate to communication endpoints and in particular to communication applications for communication endpoints.

BACKGROUND

Modern communications solves a long-standing problem of limited means of communicating with others. In the not too distant past, communications were limited to face to face, paper mail, and voice telephone calls. With the advent of email, Instant Messaging, video calls, and social networking applications, the problem has changed from limited access to information overload. As a result, people are faced with attempting to juggle multiple simultaneous meetings and/or communication sessions. This has led to people being forced to multitask between communication sessions, meetings, messages, and the like.

The proliferation of mobile communication devices has complicated the problem of information overload. For example, mobile communication devices typically have a small screen where only a single window for an application can be displayed at one time. As the user starts running multiple applications, the user may not remember which applications are currently active or the status of the applications. As a result, the user is not always able to multitask successfully.

These problems can become even more difficult when a user is involved in a live communication session while multitasking with other applications. For example, as the user multitasks, the user may forget whether the live communication session has been muted. As a result, the user may do something in the live communication session that was not intended. This can result in embarrassment to the user, or can compromise business dealings.

SUMMARY

Systems and methods are provided to solve these and other problems and disadvantages of the prior art. When a communication session is established, display information is sent to a first window of a communication application. The first window of the communication application displays current status information for the live communication session. For example, the first window may include a mute status (e.g., that the call is currently muted by the user), session recording status, and call time. When the display of the communication application is switched to a second window that covers or replaces the first window, display information for a call dart is sent that displays current status information for the first live communication session over a portion of the second window. For example, the call dart may be a small thumbnail or banner that allows the user to view the current status of the live communication session, such as the mute status of the live communication session, the recording state, and the current duration of the live communication session.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

FIG. 3A is a diagram of a display of a communication endpoint displaying a first window of a communication application.

FIG. 3B is a diagram of a display of a communication endpoint displaying a second window with multiple call darts.

DETAILED DESCRIPTION

Figure 1:
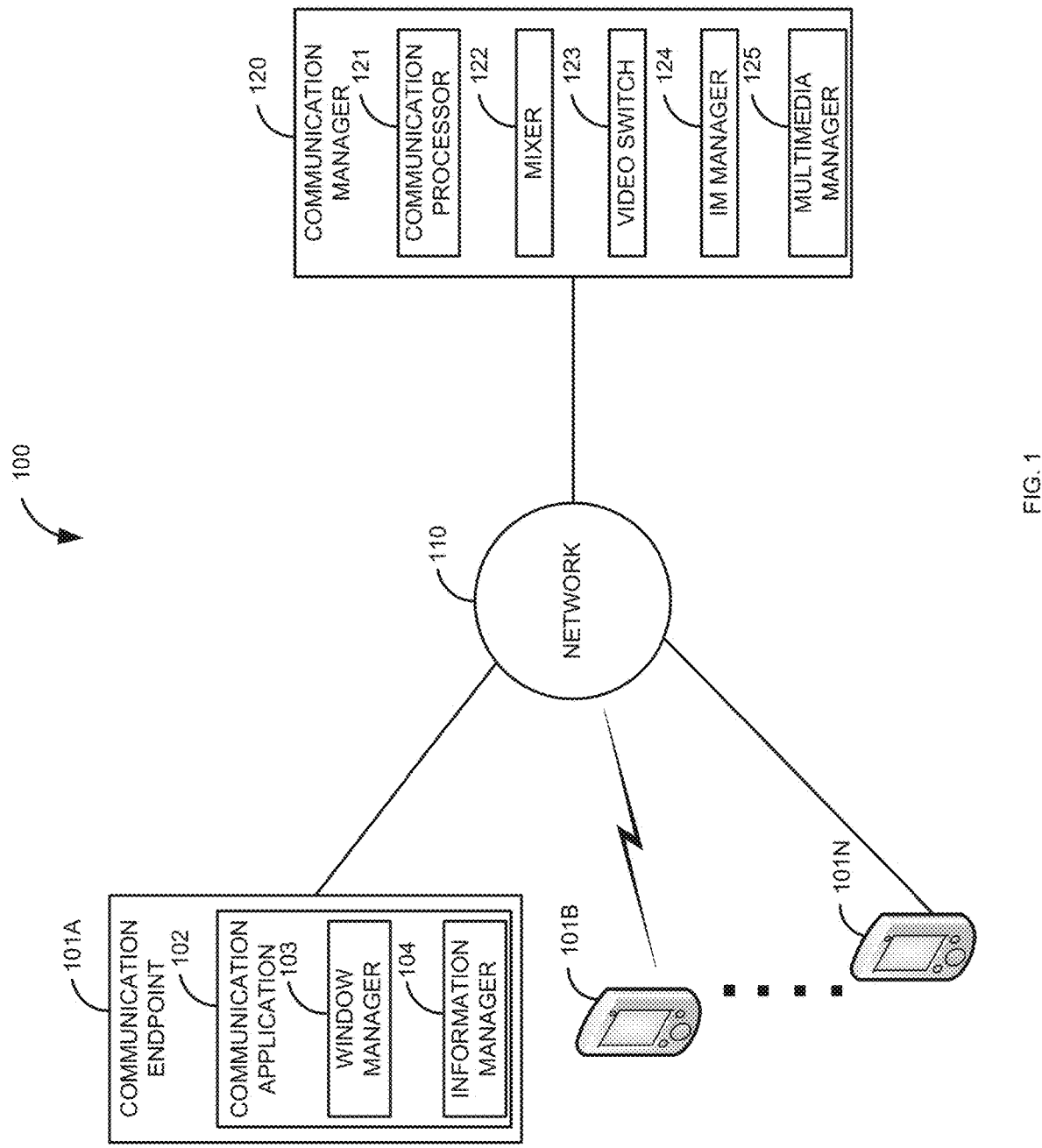
FIG. 1 is a block diagram of a first illustrative system for managing one or more live communication sessions in a communication endpoint.

FIG. 1 is a block diagram of a first illustrative system 100 for managing one or more live communication sessions in communication endpoint 101. The first illustrative system 100 comprises communication endpoints 101A-101N, a network 110, and a communication manager 120. FIG. 1 is an illustrative example, of where a communication application 102 has been downloaded or installed on the communication endpoint 101A.

The communication endpoint 101 can be or may include any hardware device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication endpoints 101A-101N may be connected to the network 110. In one embodiment, the communication endpoint 101 is a mobile communication device that has a single window display.

The communication endpoint 101A further comprises a communication application 102. The communication application 102 can be any application that can provide live communication services, such as a soft-phone, a voice phone application, a video phone application, a multimedia application, an Instant Messaging (IM) application, and/or the like. The communication application 102 may provide a single service or multiple services. For example, the communication application 102 may provide only voice services. Alternatively, the communication application 102 may provide voice, video, and IM services.

The communication application 102 further comprises a window manager 103 and an information manager 104. The window manager 103 can be any hardware/software that can be used to manage windows that are displayed in the communication endpoint 101A. The window manager 103 can manage which window/windows are currently displayed to a user.

The information manager 104 manages information for the communication application 102. For example, the information manager 104 can gather information on a live communication such as call times, called parties, mute statuses, hold statuses, recording statuses and/or the like.

In FIG. 1, only the communication endpoint 101A is shown as comprising the communication application 102, the window manager 103, and the information manger 104. However, the communication endpoints 101B-101N may or may not include the communication application 102, the window manager 103, and the information manager 104.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, Instant Messaging (IM) protocols, and the like. Thus, the network 110 is an electronic communication network configured to carry messages via packets and/or circuit switched communications.

The communication manager 120 can be or may include any hardware coupled with software/firmware that can manage live communication sessions, such as a Private Branch Exchange (PBX), a session manager, a central office switch, a router, a call processing software, and/or the like. The communication manager 120 further comprises a communication processor 121, a mixer 122, a video switch 123, an Instant Messaging (IM) manager 124, and a multimedia manager 125. Although the communication manager 120 is shown as comprising elements 122-125, the communication manager 120 may or may not include one or more of the elements 122-125 based on which types of live communication sessions are being supported. Moreover, the elements 122-125 may be distributed within the network 110.

The communication processor 121 can be or may include any hardware coupled with software that can process communication sessions, such as a microprocessor, a digital signaling processor, an application specific processor, a call processing software, and/or the like. The communication processor 121 routes and manages various types of communication sessions within the communication manger 120.

The mixer 122 can be or may include any hardware coupled with software that can mix voice communications, such as a conference bridge. The mixer 122 may be distributed between the communication manager 120 and the network 110. The mixer 122 can mix voice communications from any of the communication endpoints 101A-101N.

The video switch 123 can be or may include any hardware coupled with software that can switch and manage video communications, such as a video server, a video processor, and/or the like.

The IM manager 124 can be or may include any hardware/software that can manage IM communication sessions. The IM manager 124 can manage IM communication sessions between a the of communication endpoints 101A-101N.

The multimedia manager 125 can be or may include any hardware/software that can manage multimedia communications. The multimedia manager 125 can mange various multimedia communication sessions between the communication endpoints 101A-101N.

Figure 2:
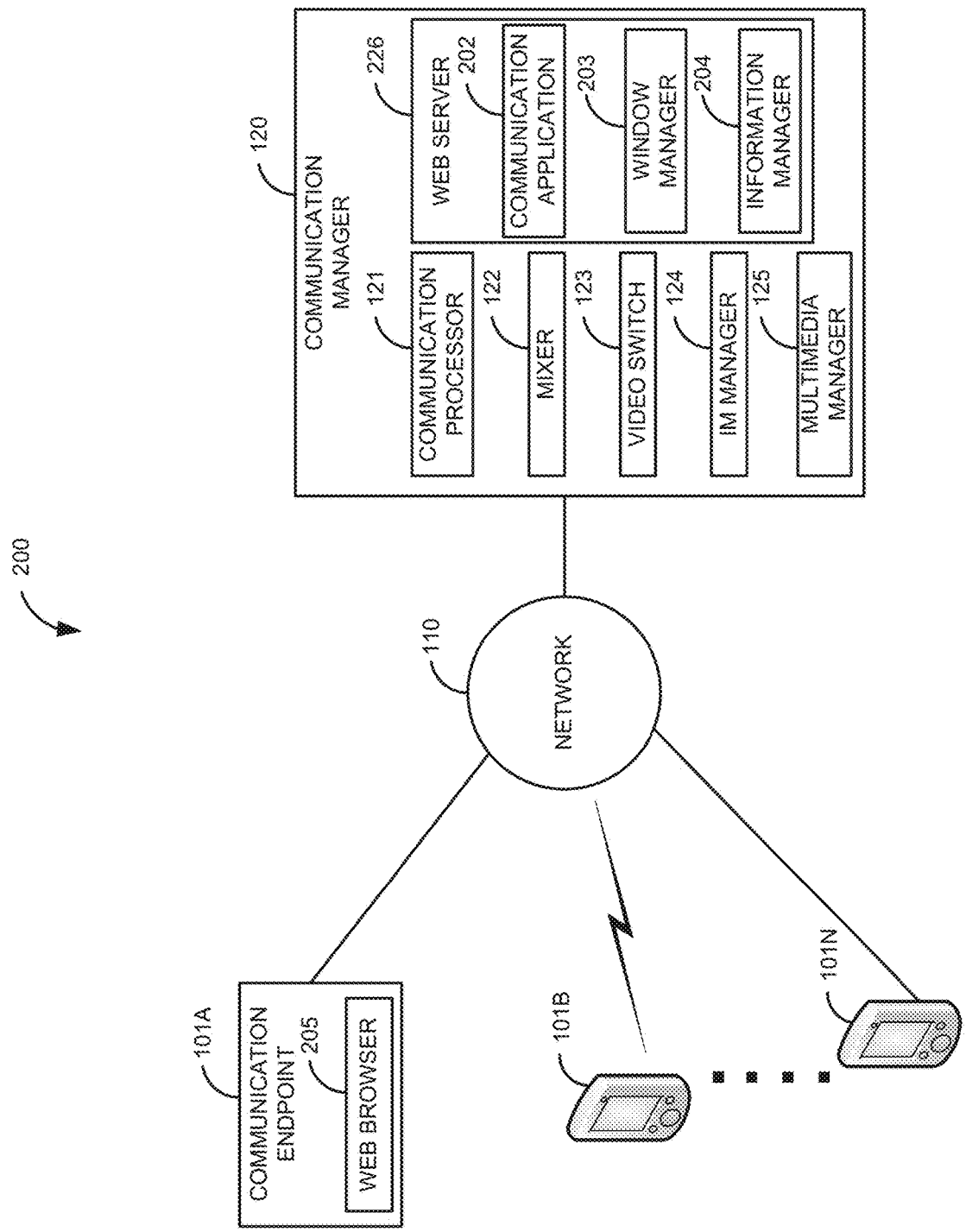
FIG. 2 is a block diagram of a second illustrative system for managing one or more live communication sessions in a communication endpoint.

FIG. 2 is a block diagram of a second illustrative system 200 for managing one or more live communication sessions in communication endpoint 101. FIG. 2 is an exemplary embodiment of where the communication application 202 is implemented by a web server 226 and presented to a user of the communication endpoint 101A via a web browser 205. The second illustrative system 200 comprises the communication endpoints 101A-101N, the network 110, and the communication manger 120.

The communication endpoint 101A further comprises the web browser 205. The web browser 205 may be any software that allows the user of the communication endpoint 101A to browse web pages of the web server 226, such as Internet Explorer™, Google Chrome™, Opera™, Dolphin™, Safari™, and/or the like.

The communication manger 120 further comprises the communication processor 121, the mixer 122, the video switch 123, the IM manager 124, the multimedia manager 125, and the web server 226. The web server 226 may be any web server that can provide web services to the network 110, such as Apache™, Nginx™, Microsoft-IIS™, LiteSpeed™, Tomcat™, and/or the like.

The web server 226 further comprises a communication application 202, a window manager 203, and an information manager 204. The communication application 202, the window manager 203, and the information manager 204 are web or/or server based implementations of the communication application 102, the window manager 103, and the information manager 104 of FIG. 1. Although not shown, the communication application 102/202 may be a distributed communication application that is distributed between the communication endpoint 101A and the communication manager 120. In one embodiment, the communication endpoint 101A may have an installed communication application 202 that communicates with the web server 226 rather than communicating directly with the communication application 202.

FIG. 3A is a diagram of a display 300 of a communication endpoint 101 displaying a first window 320 of a communication application 102/202. The communication endpoint 101 includes a display 300. The display 300 can be any display that can display information, such as a touch screen, a Liquid Crystal Display (LCD), a Light Emitting Diode (LED) display, a plasma display, and/or the like.

The communication application 102/202 can be any type of live communication application, such as a voice communication application, a video communication application, a multimedia communication application, an Instant Messaging (IM) application, and/or the like. In this exemplary embodiment (FIG. 3A), the communication application 102/202 is a voice communication application. The communication application 102/202 includes a first window 320. The following description describes where the communication application 102/202 only has a single active window. However, the communication application 102/202 may have multiple layers of windows (e.g., windows that are stacked on top of each other). The first window 320 of the communication application 102/202 comprises a talk button 302, an end button 303, a keypad 304, and a contacts button 305. The talk button 302 is for initiating a voice communication session. The end button 303 is for ending a voice communication session. The keypad 304 is for dialing a number for a voice communication session. The contacts button 305 is for looking up contacts (i.e., people), for establishing a voice communication session.

The communication endpoint 101 also is shown displaying a back button 306, a main menu button 307, and a window button 308. The back button 306 allows a user of the communication endpoint 101 to go back to the previous window. The main menu button 307 allows a user of the communication endpoint 101 to see a view of main applications on the communication endpoint 101. The window button 308 allows a user to select one of the currently active windows.

The communication application 102/202 is used to establish one or more live communication sessions. After the live communication session(s) are established, the user may browse to other windows/applications while listening/talking/chatting on the live communication session. As a result, the first window 320 of the communication application 102/202 is replaced by a second window 321. For example, as shown in FIG. 3B, the second window 321 may be a second window 321 of the communication application 102/202 or a second window 321 of a different application. The second window 321 may comprise the back button 306, the main menu button 307, the window button 308, a file icon 330, application icon 331, and a transfer button 332. In some embodiments, the buttons 306-308 are home buttons that are always displayed, regardless any windows being displayed. In FIG. 3B, the transfer button 332 is shown in the second window 321 of the communication application 102/202. However, the transfer button 332 may be on a different window of the communication application 102/202 that the user has to navigate back to. FIG. 3B also includes call darts 310A-310B. Although the second window 321 is shown with different elements 330-332, the second window 321 may contain individual elements 330-332 or other elements in any number or combination from 0 to N, where N is an integer.

The second window 321 may be for a variety of applications or services. For example, the second window 321 may be where a user is viewing contact history, looking at a list of contacts, looking at a calendar, opening a word processing application, opening a new chat session, viewing an email, and/or the like.

The file icon 330 represents any file that can contain information, such as a text file, a word processing application file, a spreadsheet, a document, a graphics file, a picture, a video file, and/or the like. The application icon 331 may represent any application, such as a word processing application, a multimedia application, a spreadsheet application, a gaming application, a virtual reality application, and/or the like. The transfer button 332 can be used by the user to transfer the live communication session to another party.

A call dart 310 is a small tab, thumbnail, banner, and/or the like that is used to provide the user with a simplified view of the live communication session in the communication endpoint 101. The call dart 310 displays current status information for the first live communication session over a small portion of the second window 321 (e.g., over only 10% of the second window 321). The call dart 310 allows the user the ability to view current status information for the live communication session while viewing other windows of the communication application 102/202 or windows of other applications. For example, the user may want to view a document while on the live communication session.

FIG. 3B shows two call darts 310A-310B that represent two different live communication sessions. The call dart 310A comprises a mute status button 311 and a video view pane 313. The call dart 310A is for a live video communication session. In this example, the user has muted the live video communication session as indicated by the line across the microphone in the mute status button 311. The mute status button 311 allows the user to mute/unmute the live video communication session by selecting/clicking on the mute status button 311.

The video view pane 313 provides a small view of the live video communication session. In one embodiment, the video view pane 313 can include all the streams from the parties in the live video communication session. For example, if there were two other parties on the live video communication session, the video view pane 313 would include both video streams in the video view pane 313. Alternatively, the video view pane 313 may be configured to only show the party who is currently talking in the live video communication session (even though a view from the first window 320 of the communication application 102/202 may show all the video streams.

The call dart 310B is for a voice communication session that has been placed on hold by the user. The call dart 310B has a hold status button 312 and a status pane 314. The hold status button 312 allows the user to take the live voice communication session off hold. The status pane 314 shows the name of the calling party (Jim Ott) that is on hold and a time (1 minute, 56 seconds) that the calling party has been on hold.

The call dart 310 may contain multiple buttons/information. For example, the call dart 310 may include a video mute button and a voice mute button. The call dart 310 may contain other information/buttons, such as, a communication session time, recording status indicator, a small view of a collaboration (or multimedia) screen share, a go to first window button, a name of one or more party on the live communication session, a picture of the party on the live communication session, a video of the live communication session, a display of the live communication session, a call dropped indicator, a conference indicator, a currently talking party, and/or the like. The call dart 310 is displayed when a second window 321 is displayed over or in place of the first window 320 of the communication application 102/202. The call darts 310A-310B may be call darts 310 generated from the same communication application 102/202 or may be generated by separate communication applications 102/202.

For example, after establishing a live video communication session, the user brings up a main menu or a file browser application. When the second window 321 of the communication application 102/202 or window of another application, is displayed, a call dart 310 of the live communication session is displayed. The user may establish an additional live communication session from the same communication application 102/202 or from a second communication application 102/202. If the live communication sessions are established using different communication applications 102/202, the respective call darts 310 are displayed when the respective first window of the respective communication application 102/202 is covered by a second window 321.

In one embodiment, the call dart 310 may be displayed when an incoming call is received (e.g., voice, video, IM). For example, the call dart 310 may have a button to accept/decline the call and a pane that indicates who is calling.

FIG. 3B shows the call darts 310A-310B as being on the right side of the display 300. In some embodiments, the user may be able to move the call darts 310A-310B to any edge or corner of the display 300 (which includes up and down and along the side). For example, the user may move the call dart 310A to the top or bottom edge of the display by holding a finger or cursor on the call dart 310A and then moving the finger or cursor along the edge of the display to the top or bottom edge. In some embodiments, the location of the call darts 310A-310B may be configured. For example, if the user is left handed, the user may configure the call darts 310A-310B to be initially displayed on the left hand side of the display 300.

The call darts 310A-310B allows a user to drag-and-drop objects into the live communication session. For example, the user may drag-and-drop the file icon 330 onto the call dart 310A as shown in step 340 to drop a file (represented by the file icon 330) for use within the live communication session. This allows the file represented by the dragged-and-dropped file icon to be included either for display in the video communication session, added to a library associated with the communication session, and/or as an attachment that can be viewed by the participants of the live video communication session.

Similarly, a user may drag-and-drop an application onto the live communication session. For example, the user may drag-and-drop a spreadsheet application (represented by the application icon 331) onto the live video communication session as shown in step 341, which will share the spreadsheet application in a collaboration session with other participants.

In another embodiment, the user may drag-and-drop the call dart 310 onto a button. For example, as shown in step 342, the user drags-and-drops the call dart 310B onto the transfer button 332 to transfer the call from Jim Ott to a different party. The user may also drag one call dart 310 onto another call dart 310 in order to merge the two calls together or transfer the two parties to each other.

In one embodiment, the second window 321 may have a list of contacts (e.g., a corporate directory). The user could drag-and-drop an individual contact of a person from the list of contacts to add the person to an existing call. Alternatively, the user could drag-and-drop the call dart 310 onto the contact to add the person to the call.

The above examples are just a few of may different ways a user may drag-and-drop an object (an icon), such as, a file icon 330, an application icon 331, a button 332, and/or the like onto a call dart 310 or drag-and-drop the call dart 310 onto the file icon 330, the application icon 331, the button 332 and/or the like. One of skill in the art would understand that other types of objects, such as, menus, menu items, panes, tabs, and/or the like may be dragged-and-dropped to add information, add applications, remove information, remove applications, change the communication session (e.g., transfer, fork, forward, conference disconnect etc.) and/or the like. For example, a user may drag and a contact from a list of contacts (e.g., by selecting the contact button 305 that beings up the second window 321 of the communication application 102/202. The user can then drag-and-drop the contact onto the call dart 310 to implement the function of the object (in this example, to conference the contact onto the call).

The above embodiments describe use of a call dart 310 in a single window mobile communication endpoint 101. However the above descriptions are not limited to such devices, but may also work on non-mobile communication devices 101, such as a personal computer or desktop. For example, the call dart 310 may be used where a user has displayed a full screen window over the communication application 102/202 (e.g., where the user only has a single monitor). In this exemplary embodiment, the call dart 310 may contain key buttons/information, such a mute button, incoming video, video mute, information for chat messages, such as receipt of new messages, and/or the like. For example, the call dart 310 concept may be used where a user is providing a multimedia/collaboration application as part of a multimedia conference call. When the user brings up the multimedia/collaboration application, the call dart 310 will appear on the user's screen while the other participants in the multimedia/collaboration communication session will not see the call dart 310. Alternatively, the call dart 310 may appear when the second window 321 just covers the first window 320, even though the second window 321 is not covering the full display 300.

When a collaboration session is placed on hold, the call dart 310 can show a small representation of the current collaboration screen that is updated as the collaboration session progresses (even though the voice is on hold). This allows the user to multitask. For example, the user may send an instant message, watch the progress of the collaboration session and know when to jump back into the call, listen to the live call and control mute, and/or the like.

Figure 4:
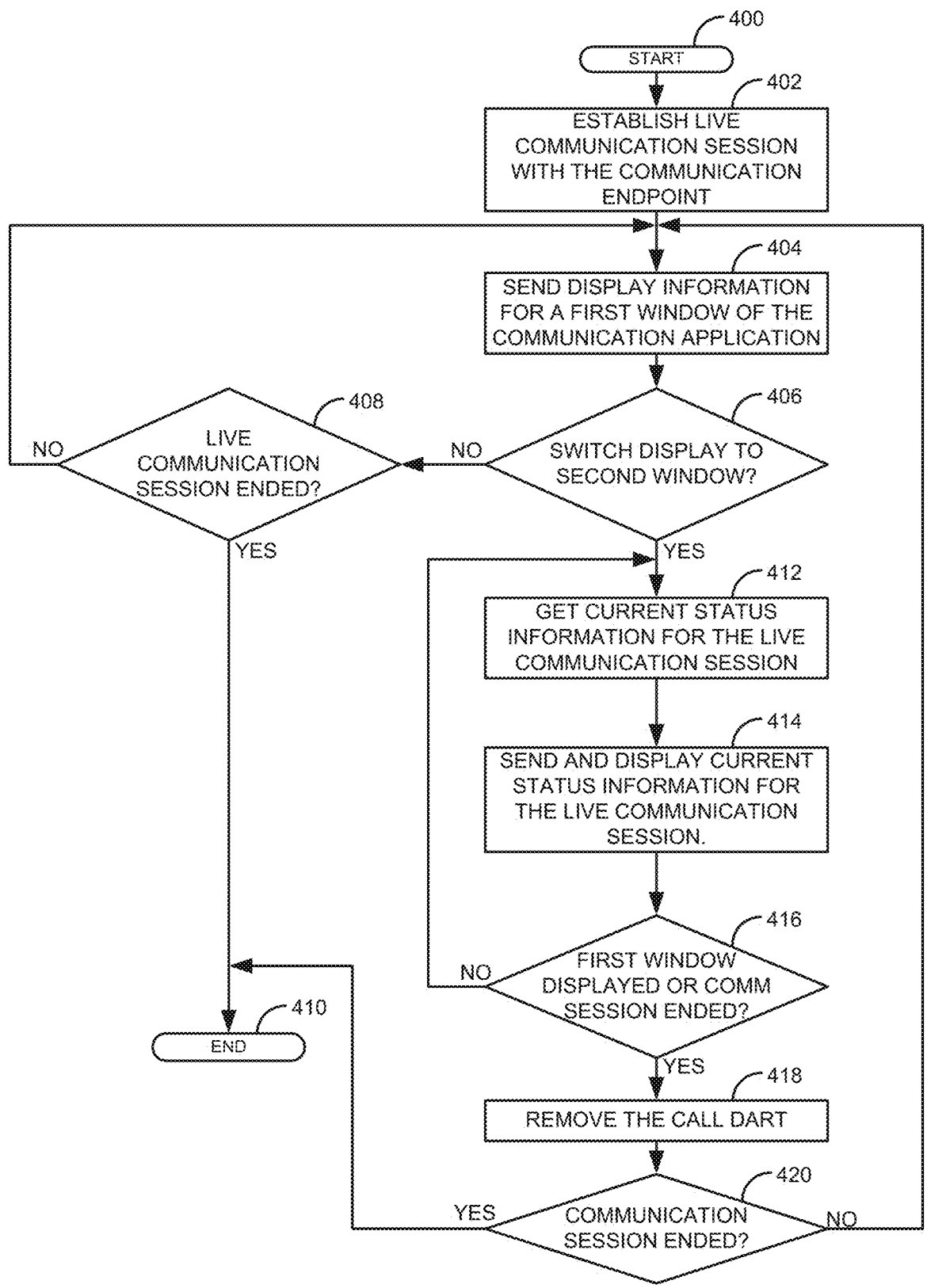
FIG. 4 is a flow diagram of a process for managing one or more live communication sessions in communication endpoint.

FIG. 4 is a flow diagram of a process for managing one or more live communication sessions in a communication endpoint 101. Illustratively, the communication endpoints 101A-101N, the communication applications 102/202, the window managers 103/203, the information managers 104/204, the communication manager 120, the communication processor 121, the mixer 122, the video switch 123, the IM manager 124, the multimedia manager 125, and the web server 226 are stored-program-controlled entities, such as a computer or processor, which performs the method of FIGS. 3-7 and the processes described herein by executing program instructions stored in a non-transitory computer readable storage medium, such as a memory or disk. Although the methods described in FIGS. 3-7 are shown in a specific order, one of skill in the art would recognize that the steps in FIGS. 3-7 may be implemented in different orders and/or be implemented in a multi-threaded environment. Moreover, various steps may be omitted or added based on implementation.

The embodiments discussed below describe the use of the communication application 102/202, the window manager 103/203, and the information manager 104/204 interchangeably. This means that the processes of FIG. 4-7 may be implemented using any of the embodiments or descriptions described in FIGS. 1-3. For example, the processes of FIGS. 4-7 may be implemented by a communication application 102 on the communication endpoint 101A or alternatively the process of FIGS. 4-7 may be implemented by a browser 205/web server 206.

The process starts in step 400. The communication manager 120 establishes the live communication session with the communication endpoint 101A in step 402. For example, the communication manager 120, via the communication application 102 and/or 202, establishes a voice communication session between the communication endpoints 101A-101B. The communication application 102/202 sends, in step 404, display information for the first window 320 of the communication application 102/202 for view by the user. For example, once the call is established, the communication application 102/202 sends information to show that the voice communication session has been established and that the call is not muted.

The window manager 103/203 determines, in step 406, if a command has been received to switch display to a second window 321. If the command to switch display to the second window 321 has not been received in step 406, the communication application 102/202 determines if the live communication session has ended in step 408. If the live communication session has not ended in step 408, the process goes back to step 404 to send display information if necessary. Otherwise, if the live communication session has ended, the process ends in step 410.

If the window manager 103/203 determines, in step 406, that a command has been received to switch display to the second window 321, the information manager 104/204 gets current status information for the live communication session in step 412. For example, the information manager 104/204 may get a mute status, a call time, a hold status, a call participant name, recording status, and/or the like. The communication application 102/202 sends and displays the current status information in the call dart 310 for the live communication session in step 414. For example, the current status information may look similar to what is displayed in call dart 310A.

The window manager 103/203 determines, in step 416, if the first window 320 is now displayed or if the communication session has ended. If the first window 320 is not displayed and the communication session has not ended in step 416, the process goes back to step 412 to get the current status information for the live communication session. For example, to update the live status information (e.g., a time of the live communication session) in the call dart 310.

Otherwise, if the first window 320 is displayed or the communication session has ended in step 416, the communication application 102/202 removes the call dart 310 for the live communication session from being displayed in step 418. The communication application 102/202 determines if the communication session has ended in step 420. If the communication session has not ended in step 420, the process goes back to step 404. Otherwise, if the communication session has ended in step 420, the process ends in step 410.

The process of FIG. 4 is for an individual live communication session. However, the process of FIG. 4 is not limited to a single communication session. For example, the process of FIG. 4 can be implemented where a separate thread is implemented for each live communication session. This way a separate call dart 310 is displayed for each live communication session.

Figure 5:
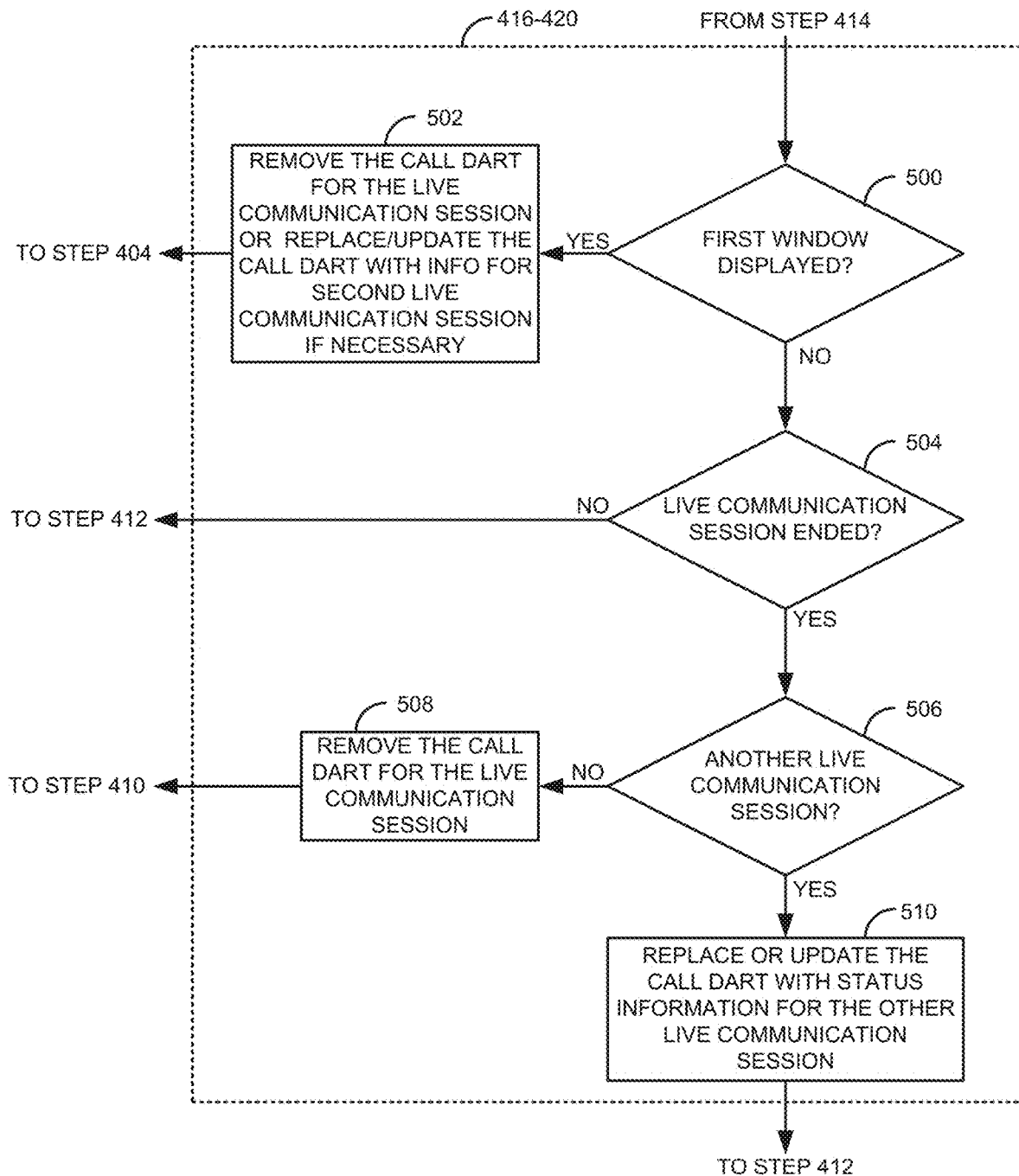
FIG. 5 is a flow diagram of a process for managing a single instance call dart.

FIG. 5 is a flow diagram of a process for managing a single instance call dart 310. A single instance call dart 310 is where a single call dart 310 is used for multiple live communication sessions. The process of FIG. 5 replaces steps 416-420 of FIG. 4.

After sending/displaying the call dart 310 in step 414, the window manager 103/203 determines if the first window 320 is displayed in step 500. If the first window 320 is displayed, the call dart 310 for the live communication session (associated with the first window 320) is removed or replaced/updated with information for a second live communication session from a second application if there is one. The process then goes to step 404.

Otherwise, if the first window 320 is not displayed in step 500, the communication application 102/202 determines in step 504 if the live communication session has ended. If the live communication session has not ended in step 504, the process goes to step 412 to get the current status information.

Otherwise, if the live communication session has ended in step 504 the communication application 102/202 determines if there is another live communication session in step 506. If there is not another live communication session in step 506, the communication application 102/202 removes the call dart 310 for the live communication session in step 508 and then ends in step 410.

If there is another live communication session in step 506, the communication application 102/202 replaces or updates the call dart 310 with the current status information for the other live communication session in step 510. The process then goes to step 412 to get current status information for the other live communication session.

For example, consider the following example. Assume that the user has established two live voice communication sessions. The first live communication is a voice communication session that the user is participating in and the second live communication session is on hold. The call dart 310 is currently displaying status information for the first live communication session. When the first live communication session ends, the call dart 310 is replaced with a second call dart 310 that displays that the second call is on hold (e.g., as shown in call dart 310B). The user can then select the hold status button 312 to join the live communication session for the second call that was on hold.

In one embodiment, the user may be able to select the single instance call dart 310 to toggle between the different live communication sessions. For example, the user may right click or long touch on the call dart 310 to get a list of live communication sessions. The user can the select one of the live communication sessions to display the call dart 310 for the selected live communication session. Alternatively, the call dart 310 for a particular live communication session may be displayed ahead of another live communication session based on configuration information. For example, a live voice/video/multimedia call may have a higher priority than a call that is on hold or an IM session.

In one embodiment, the call dart 310 may include a small icon that indicates there are multiple live communication sessions represented by the call dart 310. The user can then select the small icon to get a list of live communication sessions to select to display the respective call dart of the selected live communication session. In one embodiment, a single call dart 310 may represent multiple live communication sessions from multiple communication applications 102/202.

Figure 6:
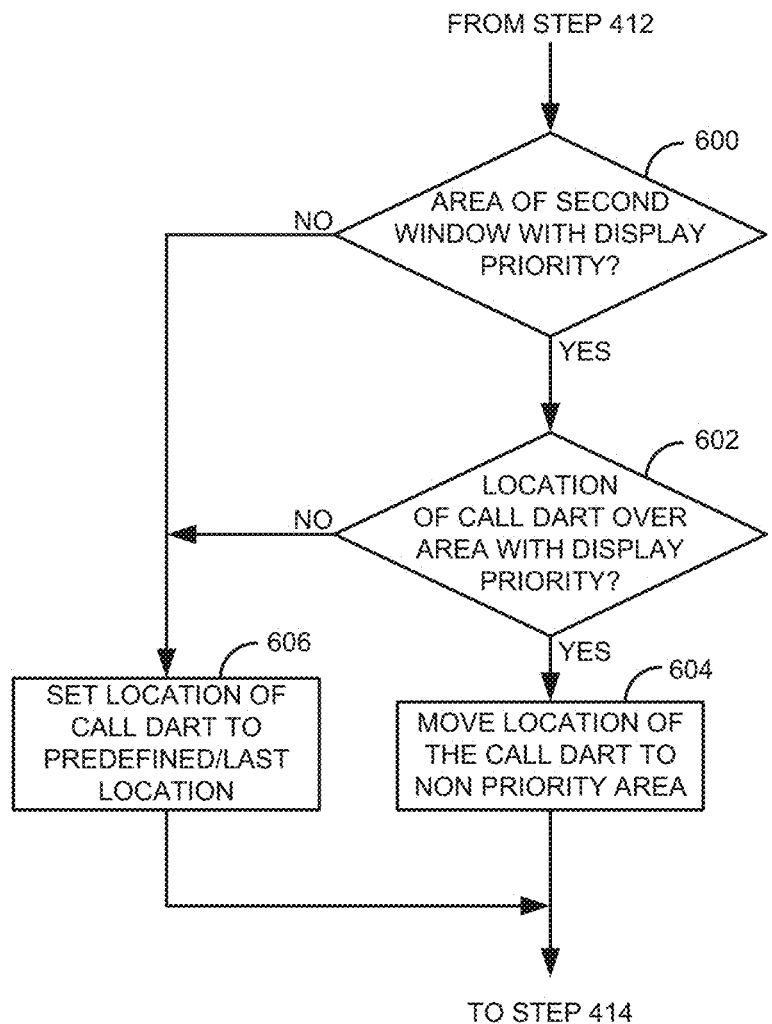
FIG. 6 is a flow diagram of a process for moving a call dart to a non-priority area in a window.

FIG. 6 is a flow diagram of a process for moving a call dart 310 to a non-priority area in a window. The process of FIG. 6 goes between the steps of 412 and 414 of FIG. 4. After getting the current status information in step 412, the window manager 103/203 determines if there is an area the second window 321 with a display priority in step 600. A display priority can be where the call dart 310 would be displayed over an area that can cause user input/view problems. For example, a display priority may be made for a virtual keyboard. Having the call dart 310 over the virtual keyboard may not allow the user to select the necessary keys when entering text information. The priority area can be any area in the second window 321. The priority area may change as the user uses the second window 321. For example, if the user selects a text box, the virtual keyboard (priority area) may appear, which changes a priority area where the virtual keyboard is displayed.

If there is not an area of the second window 321 with a display priority in step 600, the communication application 102/202 sets the location of the call dart 310 to a predefined or last location in step 606 and the process goes to step 414. The last location may where the user last moved the call dart 310. The predefined location may be specific to the type of live communication session being made or based on configuration information. For example, if the live communication session is a voice communication session, the call dart 310 may appear on the left side of the display 300 and if the live communication session is a video communication session, the call cart 310 may appear on the right side of the display 300.

Otherwise, if the area of the second window 321 has a display priority in step 600, the window manager 103/203 determines if the call dart 310 is over the area with the display priority in step 602. If the call dart 310 is not over the area with the display priority in step 602, the process goes to step 606. Otherwise, if the location of the call dart 310 is over the area with the display priority in step 602, the communication application 102/202 moves the location of the call dart 310 to a non-priority area in step 604 and the process goes to step 414.

Figure 7:
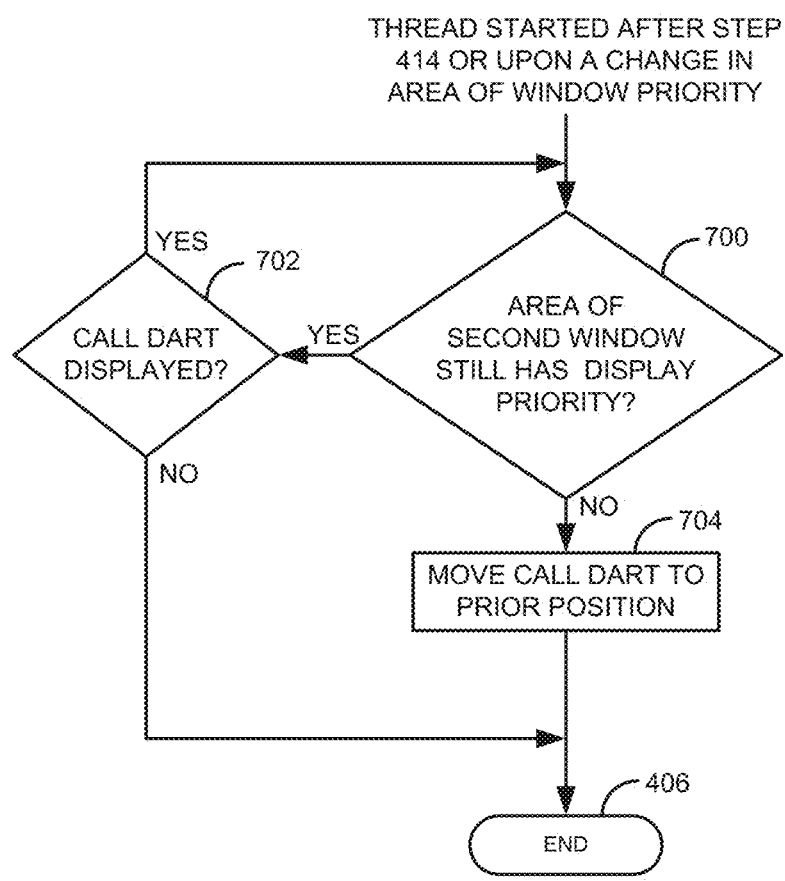
FIG. 7 is a flow diagram of a process for moving a call dart back to a prior position based on a change in display priority.

FIG. 7 is a flow diagram of a process for moving a call dart 310 back to a prior position based on a change in display priority. The process of FIG. 7 starts a thread after step 414 or based on a change in window priority for the second window 321 (e.g., when the second window 321 is displayed). The window manager 103/203 determines if the area of the second window 321 still has the display priority in step 700. For example, if the virtual keyboard is still displayed. If the area of the second window 321 still has the display priority in step 700, the window manager 103/203 determines if the call dart 310 is still displayed in step 702. If the call dart 310 is still displayed in step 702, the process goes back to step 700. Otherwise, if the call dart 310 is no longer displayed in step 702, the process ends in step 406.

If the area of the second window 321 no longer has the display priority in step 700, the communication application 102/202 moves the call dart to the prior position in step 704. The process then ends in step 406.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A computer readable non-transitory medium having stored thereon instructions that, when executed, cause a processor to perform a method, the instructions comprising:

instructions to send display information of a first window of a communication application, wherein the communication application displays information for a first live communication session;
instructions to switch display of the communication application to a second window that covers the first window;
in response to switching display of the communication application to the second window, instructions to send display information for a first call dart that displays current status information for the first live communication session over a portion of the second window;
instructions to detect an area of the second window that has a higher display priority than the first call dart;
instructions to, in response to detecting the area of the second window that has the higher display priority, determine if the first call dart is over the area of the second window that has the higher display priority;
instructions to, in response to determining that the first call dart is over the area of the second window that has the higher display priority, determine an area of the second window that has a lower display priority than the first call dart;
instructions to, in response to determining the area of the second window that has the lower display priority, move display of the first call dart from the area of the second window that has the higher display priority to the area of the second window that has the lower display priority;
instructions to automatically switch display of the communication application from the second window to the first window, wherein the first window covers the second window; and
instructions to, in response to automatically switching display of the communication application from the second window to the first window, update or replace the first call dart with current status information of the first live communication session or a second live communication session.

2. The computer readable non-transitory medium of claim 1, wherein the first live communication session is one of a voice communication session, a multimedia communication session, a collaboration session, or video communication session and wherein the current status information includes a mute button that displays whether the first live communication session has been muted or not.

3. The computer readable non-transitory medium of claim 1, wherein the first live communication session is a video communication session that displays a plurality of video streams of a plurality of parties on the video communication session and further comprising:
instructions to determine a party who is currently talking in the live video communication session; and
in response to determining who is currently talking in the live video communication session, instructions to display a video stream of the party who is currently talking in the live video communication session on the first call dart.

4. The computer readable non-transitory medium of claim 1, wherein the first live communication session comprises a second live communication session and wherein the first call dart further comprises a second call dart that displays current status information for the second live communication session.

5. The computer readable non-transitory medium of claim 1, wherein the first live communication session includes a second live communication session that has been placed upon hold and further comprising:
instructions to determine that the first live communication session has ended; and
in response to determining that the first live communication session has ended, instructions to update or replace the first call dart with current status information for the second live communication session that has been placed on hold, wherein the current status information for the second live communication session that has been placed on hold includes a button to join the second live communication session.

6. The computer readable non-transitory medium of claim 1, wherein the first call dart can be moved by a user of a communication endpoint along any edge of a display on a single window communication endpoint.

7. The computer readable non-transitory medium of claim 1, further comprising:
instructions to detect an area of the second window that has the higher display priority no longer has the higher display priority; and
instructions to, in response to detecting that the area of the second window that has the higher display priority no longer has the higher display priority, move display of the first call dart from the area of the second window that had the lower display priority to a predefined position.

8. The computer readable non-transitory medium of claim 1, further comprising:
instructions to detect that an area of the second window that has the higher display priority no longer has the higher display priority; and
instructions to, in response to detecting that the area of the second window that has the higher display priority no longer has the higher display priority, move display of the first call dart to a position that the display of the first call dart was in prior to the determination of the display of the first call dart being over the area of the second window that has the higher display priority.

9. The computer readable non-transitory medium of claim 1, further comprising:
instructions to receive user input to do one or more of:
drag-and-drop an object onto the first call dart; and
drag-and-drop the first call dart onto the object, wherein the object represents one or more of a file, an application, and a communication session change object; and
instructions to, in response to receiving the user input to drag-and-drop the object onto the first call dart or receiving the user input to drag-and-drop the first call dart onto the object, implement a function of the object in the live communication session.

10. The computer readable non-transitory medium of claim 1, further comprising: instructions to display a second call dart based on receiving an incoming live communication session, wherein the second call dart has an accept/decline button.

11. The computer readable non-transitory medium of claim 1, wherein the first live communication session comprises a voice communication session and wherein the second live communication session comprises a multimedia communication session.

12. A method for managing a communication endpoint comprising:
sending display information of a first window of a communication application, wherein the communication application displays information for a first live communication session;
switching display of the communication application to a second window that covers the first window;

in response to switching display of the communication application to the second window, sending display information for a first call dart that displays current status information for the first live communication session over a portion of the second window;
detecting an area of the second window that has a higher display priority than the first call dart; in response to detecting the area of the second window that has the higher display priority, determining if the first call dart is over the area of the second window that has the higher display priority;
in response to determining that the first call dart is over the area of the second window that has the higher display priority, determining an area of the second window that has a lower display priority than the first call dart;
in response to determining that the area of the second window that has the lower display priority, moving display of the first call dart from the area of the second window that has the higher display priority to the area of the second window that has the lower display priority;
switching display of the communication application from the second window to the first window, wherein the first window covers the second window; and
in response to switching display of the communication application from the second window to the first window, updating the first call dart with current status information of the first live communication session or a second live communication session.

13. The method of claim 12, wherein the first live communication session is one of a voice communication session, a multimedia communication session, a collaboration session, or video communication session and wherein the current status information includes a mute button that displays whether the first live communication session has been muted or not.

14. The method of claim 12, wherein the first live communication session is a video communication session that displays a plurality of video streams of a plurality of parties on the video communication session and further comprising:
determining a party who is currently talking in the live video communication session; and
in response to determining who is currently talking in the live video communication session, displaying a video stream of the party who is currently talking in the live video communication session on the first call dart.

15. The method of claim 12, wherein the first live communication session comprises a second live communication session and wherein the first call dart further comprises a second call dart that displays current status information for the second live communication session.

16. The method of claim 12, wherein the first live communication session includes a second live communication session that has been placed upon hold and further comprising:
determining that the first live communication session has ended; and
in response to determining that the first live communication session has ended, updating or replacing the first call dart with current status information for the second live communication session that has been placed on hold, wherein the current status information for the second live communication session that has been placed on hold includes a button to join the second live communication session.

17. The method of claim 12, further comprising:
detecting an area of the second window that has the higher display priority no longer has the higher display priority; and
in response to detecting the area of the second window that has the higher display priority no longer has the higher display priority, moving display of the first call dart to a position that the first call dart was in prior to the determination of the first call dart being over the area of the second window that has the higher display priority.

18. The method of claim 12, further comprising:
receiving user input to do one or more of:
drag-and-drop an object onto the first call dart; and
drag-and-drop the first call dart onto the object, wherein the object represents one or more of a file, an application, and a communication session change object; and
in response to receiving the user input to drag-and-drop the object onto the first call dart or receiving the user input to drag-and-drop the first call dart onto the object, implementing a function of the object in the live communication session.

19. The method of claim 12, wherein the current status information comprises at least one of a mute status, a communication session time, a name of a party of the first live communication session, a picture of the party on the first live communication session, a hold indicator, a call dropped indicator, a recording indicator, and a conference indicator.

20. A system comprising:
a communication application configured to send display information of a first window of the communication application, wherein the communication application displays information for a live communication session and send display information for a first call dart that displays current status information for the live communication session over a portion of a second window in response to switching display of the first window of the communication application to the second window; and
a window manager configured to switch display of the first window of the communication application to the second window that covers the first window, wherein the window manager determines that an area of the second window has a higher display priority than the first call dart, the first call dart is over the area of the second window that has the higher display priority, and that an area of the second window that has a lower display priority than the first call dart, wherein the window manager moves the display of the first call dart from the area of the second window that has the higher display priority to the area of the second window that has the lower display priority, and wherein the window manager automatically updates the first call dart with current status information of the live communication session.

* * * * *